(12) United States Patent
Song et al.

(10) Patent No.: US 12,156,080 B2
(45) Date of Patent: Nov. 26, 2024

(54) SYSTEMS AND METHODS FOR EFFICIENTLY CAUSING A SECONDARY CELL TO BECOME A PRIMARY CELL

(71) Applicant: Verizon Patent and Licensing Inc., Basking Ridge, NJ (US)

(72) Inventors: Lei Song, Fremont, CA (US); Xin Wang, Morris Plains, NJ (US); Yuexin Dong, Bridgewater, NJ (US); Nischal Patel, Gilberts, IL (US); Edward Diaz, Bridgewater, NJ (US)

(73) Assignee: Verizon Patent and Licensing, Basking Ridge, NJ (US)

( * ) Notice: Subject to any disclaimer, the term of this patent is extended or adjusted under 35 U.S.C. 154(b) by 354 days.

(21) Appl. No.: 17/648,383

(22) Filed: Jan. 19, 2022

(65) Prior Publication Data
US 2023/0232286 A1    Jul. 20, 2023

(51) Int. Cl.
*H04W 36/00* (2009.01)
*H04W 36/08* (2009.01)
*H04W 36/30* (2009.01)

(52) U.S. Cl.
CPC ... *H04W 36/0016* (2013.01); *H04W 36/0061* (2013.01); *H04W 36/08* (2013.01); *H04W 36/0085* (2018.08); *H04W 36/30* (2013.01)

(58) Field of Classification Search
CPC ......... H04W 36/0016; H04W 36/0061; H04W 36/08; H04W 36/0085; H04W 36/30
See application file for complete search history.

(56) References Cited

U.S. PATENT DOCUMENTS

| | | | |
|---|---|---|---|
| 11,490,275 B2* | 11/2022 | Xu | H04B 7/0619 |
| 2012/0281544 A1* | 11/2012 | Anepu | H04B 7/0632 |
| | | | 370/328 |
| 2017/0099621 A1* | 4/2017 | Michaelsen | H04W 36/0033 |
| 2022/0361065 A1* | 11/2022 | Kumar | H04W 36/0079 |
| 2022/0386195 A1* | 12/2022 | Ishii | H04W 76/15 |

* cited by examiner

*Primary Examiner* — Shukri Taha

(57) ABSTRACT

In some implementations, a device may receive cell information regarding a current primary cell associated with a user equipment (UE), wherein the UE is further associated with a plurality of secondary cells. The device may determine, based on the cell information, that the UE is to be associated with a new primary cell, wherein the new primary cell is selected from the plurality of secondary cells. The device may generate configuration information indicating that: a particular secondary cell, of the plurality of secondary cells, is to become the new primary cell, and one or more other secondary cells, of the plurality of secondary cells, are to remain secondary cells. The device may provide, to the UE, the configuration information to configure the UE to communicate via the new primary cell.

20 Claims, 6 Drawing Sheets

SYSTEMS AND METHODS FOR EFFICIENTLY CAUSING A SECONDARY CELL TO BECOME A PRIMARY CELL

BACKGROUND

Fifth Generation/New Radio (5G/NR) provides various enhancements to wireless communications, such as flexible bandwidth allocation, improved spectral efficiency, ultra-reliable low-latency communication (URLLC), beamforming, high-frequency (e.g., millimeter wave (mmWave)) communication, and/or other enhancements.

DETAILED DESCRIPTION OF PREFERRED EMBODIMENTS

Figure 1A:
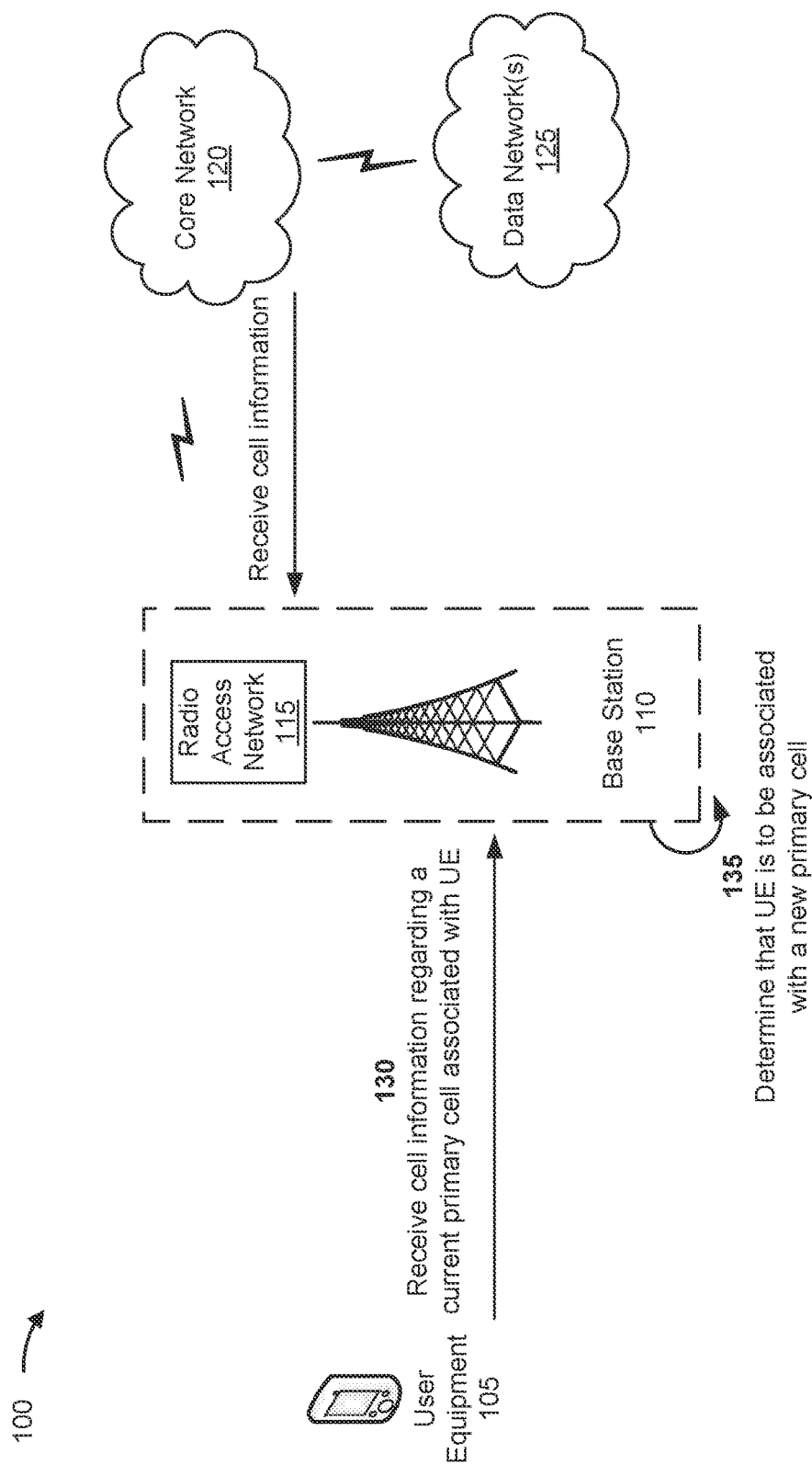
FIGS. 1A-1C are diagrams of an example associated with efficiently causing a secondary cell to become a primary cell.

The following detailed description of example implementations refers to the accompanying drawings. The same reference numbers in different drawings may identify the same or similar elements.

During deployment, a wireless network may be configured to operate in a first band (e.g., an N77 band) of 5G/NR and in a second band (e.g., an N5 band) of 5G/NR. In this regard, the network may be configured to enable carrier aggregation based on an aggregation of the first band (e.g., N77 band (which is part of the C-band)) and the second band (e.g., N5 band). A primary cell of the network may operate in the N77 band of 5G/NR and one or more secondary cells of the network may operate in the N5 band of 5G/NR. A user equipment (UE) may establish a connection with the network and may be associated with the primary cell and the one or more secondary cells.

In some situations, as the UE moves from one location to another location, a quality of a signal associated with the primary cell (e.g., operating in the N77 band) may deteriorate (e.g., the signal may become weak). The weakened signal may cause the UE to provide an indication of a radio link failure. In some situations, prior to the UE providing an indication of a radio link failure, the network may initiate a cell swap procedure during which a secondary cell (of the one or more secondary cells operating in the N5 band for example) becomes the new primary cell. As part of the cell swap procedure, an inter-frequency handoff may occur as the UE switches from communicating via the primary cell to communicating via the secondary cell.

Currently, the cell swap procedure requires resources associated with all of the one or more secondary cells to be released and then re-allocated in order to effectuate the change. Releasing and re-allocating the resources in this manner is unnecessary especially with respect to secondary cells that remain capable of supporting data transmission associated with the UE. Moreover, releasing and re-allocating the resources in this manner may cause interruption of services provided to the UE. In some situations, the interruption of services may occur over an undesirable period of time.

Moreover, the cell swap procedure involves configuring the new primary cell in a manner similar to a configuration of the secondary cell. Configuring the new primary cell in this manner involves transmitting radio resource control (RRC) messages to the UE. The RRC messages may include information regarding the configuration of the secondary cell. Configuring the new primary cell in this manner may be redundant because the information regarding the configuration of the secondary cell may have been previously provided to the UE (e.g., provided prior to the deterioration of the signal associated with the primary cell). Accordingly, the current cell swap procedure wastes network resources, computing resources, and other resources.

Implementations described herein are directed to generating configuration information (e.g., an information element) and providing the configuration information to a UE to configure the UE to communicate via a secondary cell (currently associated with the UE) as a new primary cell. The configuration information may include information indicating that the secondary cell is to become the new primary cell and information identifying one or more existing secondary cells that are to remain secondary cells. In this regard, the configuration information may include an indication that the sole purpose of the configuration information is to cause the secondary cell to become the new primary cell.

The configuration information may further include information associated with adjusting of a timing of data transmission by the UE, information indicating an update to security keys associated with data transmission via the new primary cell, information indicating a first amount of time allocated for the UE to prepare to become configured to communicate via the new primary cell, and/or information indicating a second amount of time (after providing the configuration information) for the UE to be configured to communicate via the new primary cell.

The configuration information may be provided to the UE to configure the UE to communicate via the new primary cell (e.g., the secondary cell). In some examples, the configuration information may be included in an RRC message that is provided to the UE.

Providing the configuration information in this manner prevents resources associated with the secondary cells from being released and re-allocated, especially when the secondary cells can support data transmissions associated with the UE. Additionally, providing the configuration information in this manner prevents interruption of services provided to the UE. Furthermore, providing the configuration information in this manner prevents the transmission of redundant RRC messages to configure the UE to communicate via the secondary cell as the new primary cell. Accordingly, providing the configuration information in this manner preserves network resources, computing resources, and other resources that would been consumed by the current cell swap procedure.

Figure 1B:
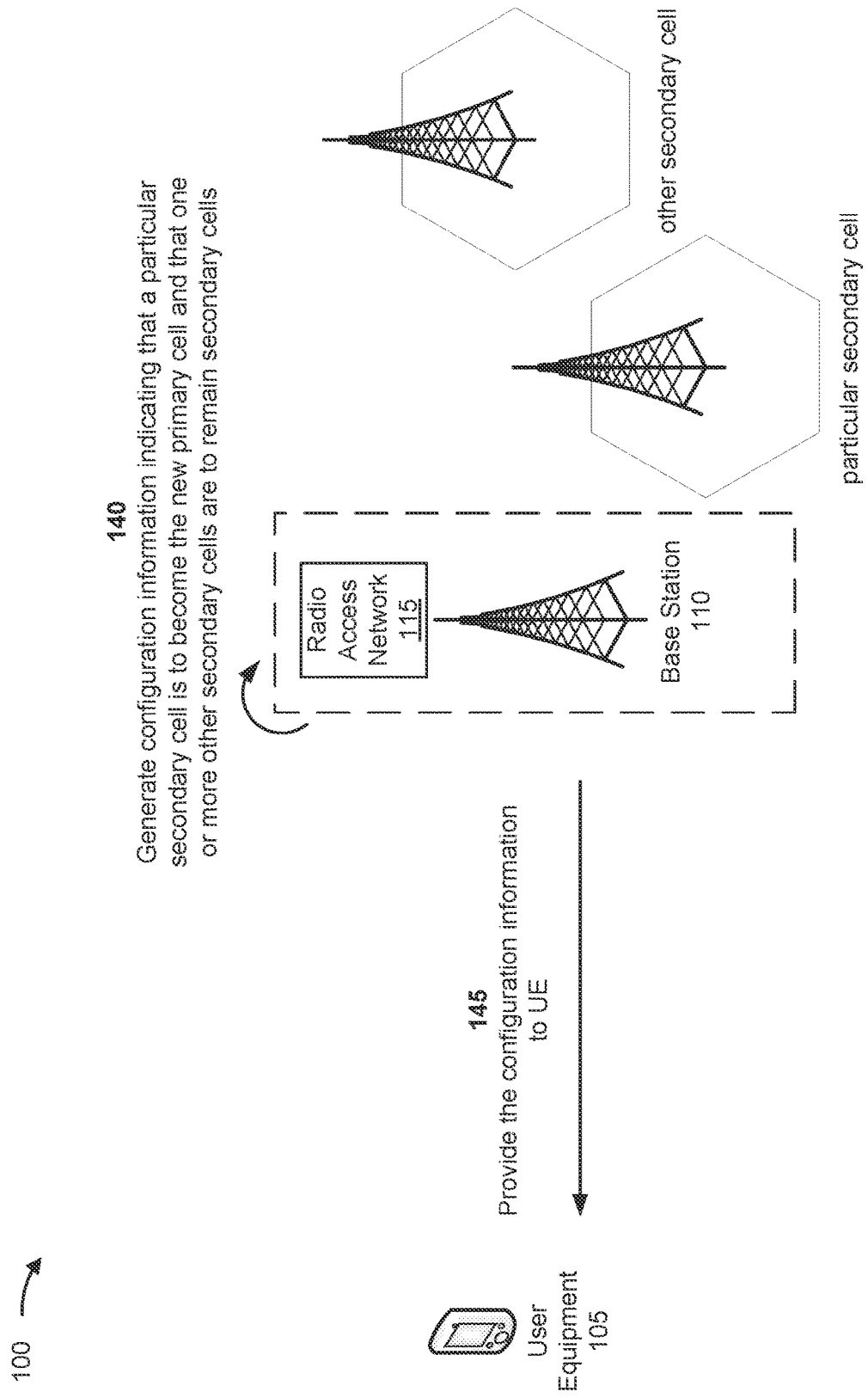
Figure 1C:
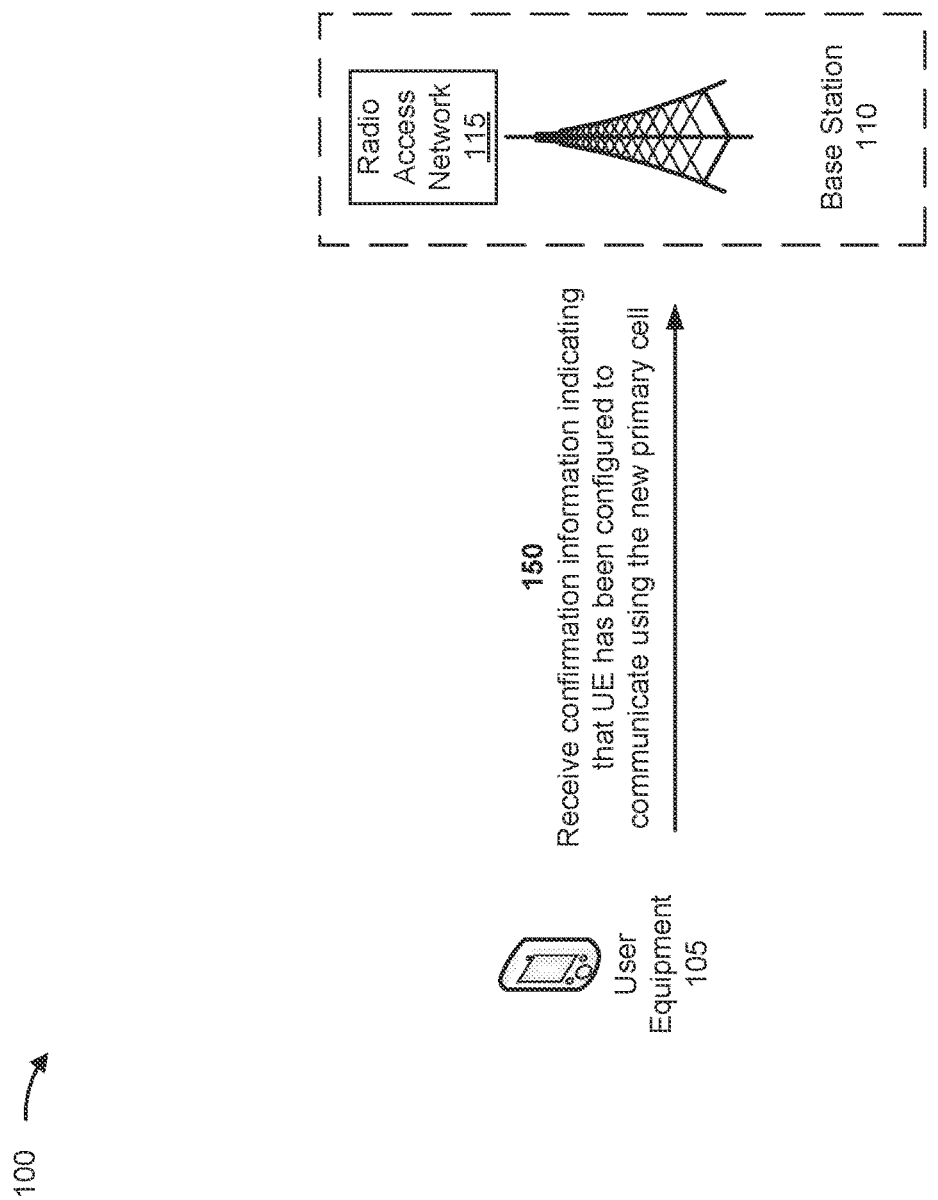

FIGS. 1A-1C are diagrams of an example 100 associated with efficiently causing a secondary cell to become a primary cell. As shown in FIG. 1A, example 100 includes a UE 105, a base station 110, a radio access network (RAN) 115, a core network 120, and one or more data networks 125 (referred to individually as "data network 125" and collectively as "data networks 125"). Example 100 illustrates various portions of a wireless telecommunications system (referred to herein as a "wireless network"). The wireless network may be a 5G wireless telecommunications system, a 4G wireless telecommunications system, a long-term evolution (LTE) wireless telecommunications system, or an LTE-Advanced (LTE-A) wireless telecommunications system. UE 105, base station 110, RAN 115, core network 120, and data networks 125 are described in more detail below in connection with FIG. 2.

In some examples, UE 105 may be wirelessly connected to RAN 115 at base station 110. Base station 110 may be connected to data network 125 via core network 120. In example 100, UE 105 may be associated with a current primary cell of base station 110. For example, UE 105 may be configured to transmit and receive data via the current primary cell. The current primary cell may be operating in a first band of 5G/NR. For example, the current primary cell may be operating in the N77 band of 5G/NR. The current primary cell may be used to transmit data used to establish a connection between UE 105 and base station 110 and/or data associated with applications that may be executing in a foreground state of UE 105. The applications may include delay-sensitive or latency-sensitive applications, such as video call applications, video streaming applications, gaming applications, navigation applications, among other examples.

UE 105 may further be associated with a plurality of secondary cells. For example, UE 105 may receive configuration information (for the plurality of secondary cells) from base station 110, from another base station, among other examples. The configuration information may include one or more parameters for configuring a physical downlink control channel (PDCCH) associated with the plurality of secondary cells, for configuring a physical uplink control channel (PUCCH) associated with the plurality of secondary cells, for configuring a physical downlink shared channel (PDSCH) associated with the plurality of secondary cells, for configuring a physical uplink shared channel (PUSCH) associated with the plurality of secondary cells, among other examples. The plurality of secondary cells may be cells of base station 110 and/or of another base station.

The plurality of secondary cells may be operating in a second band of 5G/NR different than the first band of 5G/NR. For example, the plurality of secondary cells may be operating in the N5 band of 5G/NR. In some examples, the plurality of secondary cells may be used to transmit the data, transmitted via the current primary cell, using a frequency different than a frequency associated with the current primary cell.

As shown in FIG. 1A, and by reference number 130, base station 110 may receive cell information regarding the current primary cell associated with UE 105. For example, base station 110 may receive the cell information from UE 105. In some implementations, base station 110 may receive the cell information based on a trigger. For example, base station 110 may receive the cell information based on UE 105 detecting a change with respect to a quality of a signal associated with the current primary cell, based on UE 105 detecting a change with respect to a quality of a signal associated with the plurality of secondary cells, based on a request from base station 110, among other examples. Additionally, or alternatively, to receiving the cell information based on a trigger, base station 110 may receive the cell information periodically (e.g., about every second, every fifteen seconds, among other examples).

In some examples, the cell information may include information regarding the current primary cell. For example, the cell information may include signal quality information identifying a measure of signal quality and/or of signal strength associated with the current primary cell (e.g., a measure of signal quality and/or of signal strength of the signal associated with the current primary cell). For instance, the signal quality information may include a signal to interference and noise ratio (SINR) value, a reference signal received quality (RSRQ) value, a reference signal received power (RSRP) value, a received signal strength indicator (RSSI) value, among other examples of measurements of signal quality and/or signal strength.

The cell information may further include information regarding the plurality of secondary cells. For example, the cell information may include signal quality information identifying a measure of signal quality and/or of signal strength associated with one or more secondary cells of the plurality of secondary cells (e.g., a measure of signal quality and/or of signal strength of the signal associated with the one or more secondary cells). The signal quality information associated with the one or more secondary cells may include measurements of signal quality and/or signal strength similar to the measurements of signal quality and/or signal strength described above in connection with the current primary cell.

In some situations, base station 110 may receive the cell information from one or more devices other than UE 105, such as one or more devices associated with core network 120. Base station 110 may receive the cell information from the one or more devices based on a trigger. For example, base station 110 may receive the cell information from the one or more devices based on the one or more devices detecting a change in a measure of congestion associated with the current primary cell, based on one or more devices detecting a change in congestion associated with the plurality of secondary cells, among other examples.

The cell information, received from the one or more devices, may include congestion information identifying the measure of congestion associated with the current primary cell. Additionally, or alternatively, the cell information (received from the one or more devices) may include congestion information identifying the measure of congestion associated with one or more of the plurality of secondary cells. In some examples, the measure of congestion associated with a cell may be determined based on various factors, such as a measure of radio resource usage associated with the cell, a measure of quality of service associated with the cell, a connection speed associated with the cell, among other examples.

As shown in FIG. 1A, and by reference number 135, base station 110 may determine that UE 105 is to be associated with a new primary cell. For example, base station 110 may analyze the cell information and determine that UE 105 is to be associated with a new primary cell based on analyzing the cell information. In some implementations, base station 110 may determine that UE 105 is to be associated with a new primary cell based on the signal quality information identifying the measure of signal quality associated with the current primary cell. For example, base station 110 may compare the measure of signal quality associated with the current primary cell and a signal quality threshold. In some examples, the signal quality threshold and other thresholds discussed herein may be determined by a network planner.

Based on the comparison, base station 110 may determine that the measure of signal quality does not satisfy the signal quality threshold. In some situations, the measure of signal quality may not satisfy the signal quality threshold due to loss of coverage of the current primary cell (or near loss of coverage of the current primary cell). The loss of coverage (or near loss of coverage) may result from UE 105 moving from one location to another. Base station 110 may determine that UE 105 is to be associated with a new primary cell based on determining that the measure of signal quality does not satisfy the signal quality threshold. Base station 110 may perform similar actions with respect to the measure of signal strength associated with the current primary cell.

Additionally, or alternatively, base station 110 may determine that UE 105 is to be associated with a new primary cell based on the congestion information identifying the measure of congestion associated with the current primary cell. For example, base station 110 may compare the measure of congestion associated with the current primary cell and a congestion threshold. Based on the comparison, base station 110 may determine that the measure of signal quality satisfies the congestion threshold. In some situations, the measure of congestion may satisfy the congestion threshold due to a quantity of UEs associated with the current primary cell, due to an amount of bandwidth consumed by the UEs associated with the current primary cell, among other examples. Base station 110 may determine that UE 105 is to be associated with a new primary cell based on determining that the measure of congestion satisfies the congestion threshold.

In some situations, the measure of congestion associated with the current primary cell may indicate a measure of congestion on control channels associated with the current primary cell. The control channels may include a PDCCH and a PUCCH. In some implementations, the congestion information may include information regarding a measure of load on the control channels. In this regard, base station 110 may compare the measure of the load and a load threshold. Base station 110 may determine that UE 105 is to be associated with a new primary cell based on the measure of load satisfying the load threshold. Base station 110 may determine that UE 105 is to be associated with a new primary cell for the purpose of load balancing with respect to the PDCCH and/or the PUCCH.

As shown in FIG. 1B, and by reference number 140, base station 110 may generate configuration information indicating that a particular secondary cell, of the plurality of secondary cells, is to become the new primary cell and that one or more other secondary cells are to remain secondary cells. For example, based on determining that UE 105 is to be associated with a new primary cell, base station 110 may generate the configuration information. The new primary cell may be selected from the plurality of secondary cells.

In some implementations, base station 110 may analyze the signal quality information associated with the plurality of secondary cells to identify a secondary cell to become the new primary cell. For example, based on analyzing the signal quality information, base station 110 may identify a secondary cell associated with a highest measure of signal quality from the measures of signal quality associated with the plurality of secondary cells.

Additionally, or alternatively, to analyzing the signal quality information, base station 110 may analyze the congestion information associated with the plurality of secondary cells. Base station 110 may identify one or more secondary cells (to become the new primary cell) based on analyzing the congestion information. In some examples, based on analyzing the congestion information, base station 110 may identify a secondary cell associated with a lowest measure of congestion from the measures of congestion associated with the plurality of secondary cells. Additionally, or alternatively, based on analyzing the congestion information, base station 110 may identify a secondary cell associated with a lowest measure of load from the measures of load associated with the plurality of secondary cells.

Based on analyzing the signal quality information and/or the congestion information, base station 110 may identify a particular secondary cell, from the plurality of secondary cells, as the new primary cell. For example, the particular secondary cell may be associated with the highest measure of signal quality, associated with the lowest measure of congestion, and/or associated with the lowest measure of load. In some implementations, a device of a network manager may provide preference information identifying a preference with respect the measure of signal quality, the measure of congestion, and/or the measure of load when identifying a primary cell. Base station 110 may identify the particular secondary cell further based on the preference information.

Based on analyzing the signal quality information and/or the congestion information, base station 110 may identify one or more other secondary cells, of the plurality of secondary cells (not shown), that are to remain secondary cells. For example, base station 110 may identify the one or more other secondary cells based on determining that the measure of signal quality of each of the one or more other secondary cells satisfy the signal quality threshold, based on determining that the measure of congestion of each of the one or more other secondary cells does not satisfy the congestion threshold, and/or based on determining that the measure of load of each of the one or more other secondary cells does not satisfy the load threshold. In some implementations, base station 110 may determine that the current primary cell is to become a secondary cell.

In some implementations, the configuration information may include information regarding the particular secondary cell. For example, the configuration information may include information identifying the particular secondary cell and information indicating that the particular secondary cell is to become the new primary cell. In this regard, the configuration information may include information indicating that the configuration information is for the sole purpose of configuring UE 105 to communicate with the particular secondary cell as the new primary cell. In some examples, the information identifying the particular secondary cell may include an NR Cell Identity (NCI), an NR Cell Global Identity (NCGI), among other examples.

In some situations, the information regarding the particular secondary cell may include information indicating a change of configuration of the particular secondary cell. For example, the information regarding the particular secondary cell may include information indicating a change to one or more parameters for configuring a PDCCH associated with the particular secondary cell, a PUCCH associated with the particular secondary cell, a PDSCH associated with the particular secondary cell, a PUSCH associated with the particular secondary cell, among other examples. In some examples, the change may be identified in the configuration information. Alternatively, the configuration information may indicate that the change will be identified in a subsequent message from base station 110.

The configuration information may further include information regarding the one or more other secondary cells. For example, the configuration information may include information identifying the one or more other secondary cells (e.g., NCI, NCGI) and information indicating that the one or more other secondary cells are to remain secondary cells. In some situations, the information regarding the one or more other secondary cells may include information indicating a change of configuration of the one or more other secondary cells (e.g., as described above in connection with the particular secondary cell).

In some implementations, the configuration information may include candidate information that may be used to expedite a process for changing of a primary cell and/or used to reduce a signaling overhead associated with the process. For example, the candidate information may include information indicating that UE 105 is to be pre-configured with information regarding a plurality of candidate cells (e.g., that may be used by UE 105 for data transmission). For instance, to pre-configure UE 105 with information regarding a candidate cell, UE 105 may be provided with one or more parameters for configuring a PDCCH associated with the candidate cell, for configuring a PUCCH associated with the candidate cell, for configuring a PDSCH associated with the candidate cell, for configuring a PUSCH associated with the candidate cell, among other examples.

Additionally, the candidate information may include information indicating that a particular candidate cell, of the plurality of candidate cells, is to become a next primary cell and/or that one or more other candidate cells are to become secondary cells based on UE 105 receiving a first medium access control (MAC) control element (CE). The first MAC CE may identify the particular candidate cell and the one or more candidate cells. As an example, based on receiving the first MAC CE, UE 105 may perform automatic gain control, perform frequency synchronization, and/or acquire time with respect to cells identified by the first MAC CE. In other words, based on receiving the first MAC CE, UE 105 may perform actions to configure UE 105 to communicate via the cells.

UE 105 may perform the automatic gain control and/or the frequency synchronization to enable UE 105 to transmit and/or receive data via the cells (identified by the first MAC CE) after a period of activation time. The period of activation time may correspond to a period of time required by UE 105 to be configured to transmit and/or receive data via the cells. In some examples, base station 110 may determine the period of activation time based on UE capability information identifying capabilities of UE 105. For example, base station 110 may receive the UE capability information from UE 105 and determine the capabilities of UE 105. Based on the capabilities of UE 105, base station 110 may determine the period of activation time.

Additionally, the candidate information may include information indicating that UE 105 is to start transmitting and receiving data using the particular candidate cell (e.g., the next primary cell) based on UE 105 receiving a second MAC CE or downlink control information (DCI) identifying the particular candidate cell. For example, based on receiving the second MAC CE or the DCI, UE 105 may start monitoring a PDCCH associated with the particular candidate cell after another period of activation time. The period of time may be determined in a manner similar to the manner described above in connection with the period of activation time. Based on UE 105 monitoring the PDCCH, base station 110 may start communicating UE 105 via the particular candidate cell.

The configuration information may further include information indicating an adjustment associated with timing advance. For example, the configuration information may include information indicating that UE 105 is to adjust a timing associated with UE 105 transmitting data. In some examples, the timing may be adjusted using a process involving random access channel (RACH) messages, using a synchronization signal block, among other examples. In some situations, with respect to the process involving RACH messages, UE 105 may receive duration information regarding a time duration associated with the RACH messages and/or sequence information regarding a sequence associated with the RACH messages. UE 105 may receive the duration and/or the sequence information in order to facilitate the process involving RACH messages.

In some implementations, the configuration information may include information indicating an update to security keys associated with data transmission via the new primary cell. In some examples, base station 110 may determine a first measure of security associated with data transmitted via the current primary cell and determine a second measure of security associated with data transmitted via the secondary cell. Base station 110 may compare the first measure of security and the second measure of security. If base station 110 determines that the first measure of security exceeds the second measure of security, base station 110 may include the information indicating the update to the security keys to cause UE 105 to obtain new security keys commensurate with the first measure of security.

In some implementations, the configuration information may include information indicating a first amount of time allocated for UE 105 to prepare to become configured to communicate via the new primary cell. In some examples, base station 110 may determine the first amount of time based on the capabilities of UE 105. The configuration information may further include information indicating a second amount of time, after providing the configuration information, for UE 105 to be configured to communicate via the new primary cell. In some examples, base station 110 may determine the second amount of time based on the capabilities of UE 105.

As shown in FIG. 1B, and by reference number 145, base station 110 may provide the configuration information to UE 105. In some implementations, base station 110 may provide the configuration information via a Universal Mobile Telecommunications System (UNITS) interface. In some examples, base station 110 may provide a message that includes the configuration information. The message may be provided to configure UE 105 to communicate via the new primary cell. As an example, the message may be an RRC message, and the configuration information may be an information element of the RRC message. The RRC message may include an RRC reconfiguration message or an RRC release message. The information element may be different than prior configuration information, for the particular secondary cell, previously provided to UE 105 (e.g., provided via one or more previous RRC messages). Providing the information element in this manner prevents the transmission of redundant RRC messages (including redundant configuration information) to configure UE 105 to communicate via the particular secondary cell as the new primary cell.

Base station 110 may provide the configuration information to enable UE 105 to determine that the particular secondary cell is the new primary cell and, accordingly, configure UE 105 to communicate via the particular secondary cell as the new primary cell. Additionally, or alternatively, base station 110 may provide the configuration information to enable UE 105 to determine that the one or more other secondary cells are remaining as secondary cells. Additionally, or alternatively, base station 110 may provide the configuration information to cause UE 105 to adjust a timing associated with UE 105 transmitting data via the new primary cell in a manner similar to the manner described above.

Additionally, or alternatively, base station 110 may provide the configuration information to cause UE 105 to update security keys associated with UE 105 transmitting data via the new primary cell. For example, UE 105 and base station 110 may derive new security keys, UE 105 may receive information regarding a new security algorithm based on UE security capabilities of UE 105, among other examples.

Additionally, or alternatively, to providing the configuration information to cause UE 105 to update the security keys, base station 110 may provide the configuration information to cause UE 105 to prepare to become configured to communicate via the new primary cell within the first amount of time. Additionally, base station 110 may provide the configuration information to cause UE 105 to be configured to communicate via the new primary cell within the second amount of time after providing the configuration information. Accordingly, base station 110 may provide the configuration information to cause UE 105 to be configured to communicate via the new primary cell without releasing resources associated with the plurality of secondary cells. Accordingly, base station 110 may provide the configuration information to cause UE 105 to be configured to communicate via the new primary cell without transmission of redundant RRC messages.

As shown in FIG. 1C, and by reference number 150, base station 110 may receive confirmation information indicating that the UE has been configured to communicate using the new primary cell. For example, after providing the configuration information to UE 105, base station 110 may receive, from UE 105, confirmation information indicating that UE 105 has been configured to communicate via the new primary cell. In some examples, based on providing the confirmation information, UE 105 may start monitoring the PDCCH associated with the new primary cell after the period of activation time (e.g., determined in a manner similar to the manner described above). Based on UE 105 monitoring the PDCCH, UE 105 may start communicating via the new primary cell. The new primary cell may be a cell of base station 110. Alternatively, the new primary cell may be a cell of another base station. As part of UE 105 switching to communicate via the new primary cell, an inter-frequency handoff may occur.

In some implementations, similar (or same) configuration information may be defined for interfaces between base station 110 and another base station, for interfaces within RAN 115 (e.g., interface for function split and open Interface), among other examples.

Providing the configuration information in this manner prevents resources associated with the secondary cells from being released and re-allocated, especially when the secondary cells can support data transmissions associated with the UE. Additionally, providing the configuration information in this manner prevents interruption of services provided to the UE. Furthermore, providing the configuration information in this manner prevents the transmission of redundant RRC messages to configure the new primary cell. Accordingly, providing the configuration information in this manner preserves network resources, computing resources, and other resources that would been consumed by the current cell swap procedure.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
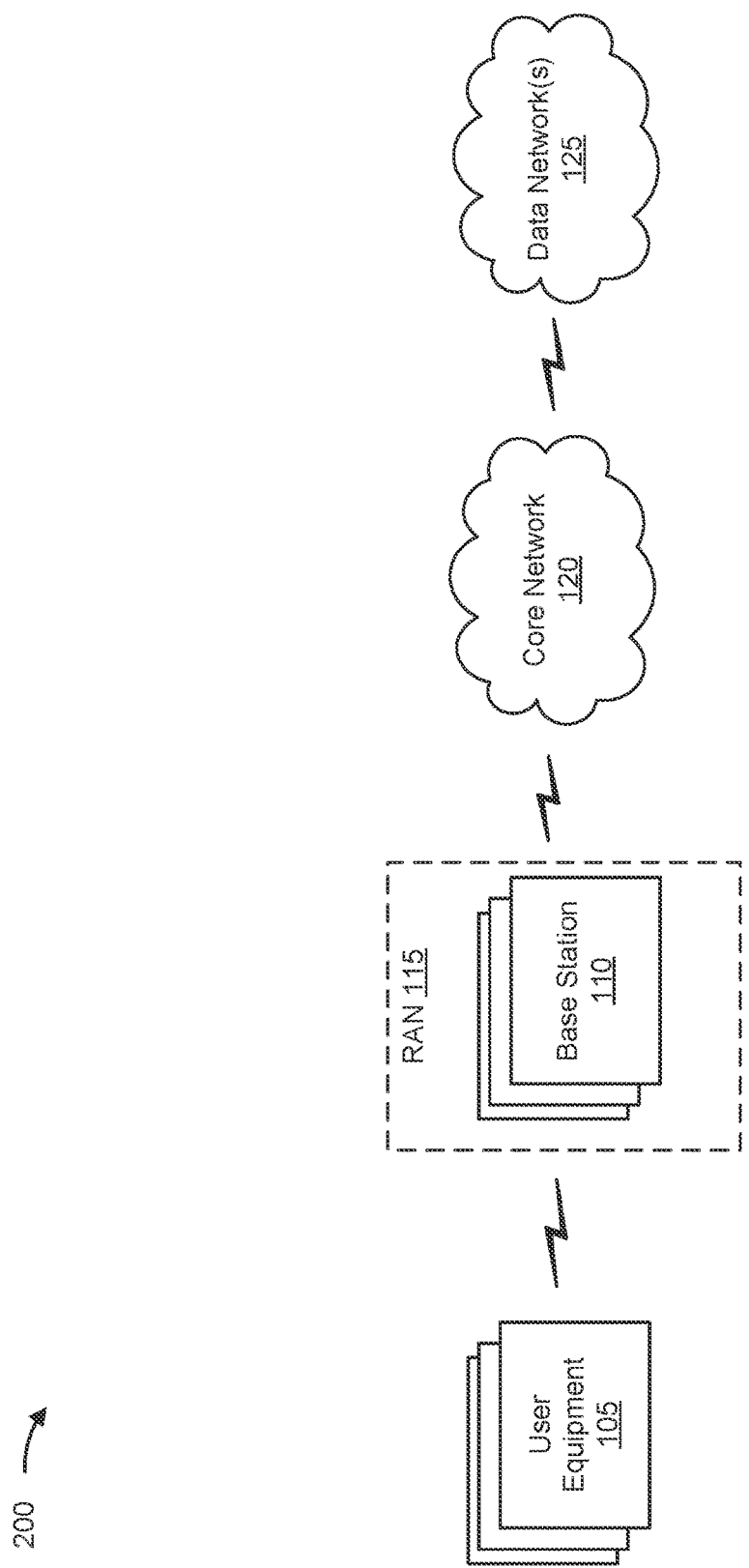
FIG. 2 is a diagram of an example environment in which systems and/or methods described herein may be implemented.

FIG. 2 is a diagram of an example environment 200 in which systems and/or methods described herein can be implemented. As shown in FIG. 2, environment 200 can include UE 105, base station 110, RAN 115, core network 120, and data network(s) 125. Devices of environment 200 can interconnect via wired connections, wireless connections, or a combination of wired and wireless connections.

UE 105 includes one or more devices capable of communicating with RAN 115 and/or a data network 125 (e.g., via core network 120). For example, UE 105 can include a wireless communication device, a radiotelephone, a personal communications system (PCS) terminal (e.g., that can combine a cellular radiotelephone with data processing and data communications capabilities), a smart phone, a laptop computer, a tablet computer, a personal gaming system, user equipment, and/or a similar device. UE 105 can be capable of communicating using uplink (e.g., UE to RAN) communications, downlink (e.g., RAN to UE) communications, and/or sidelink (e.g., UE-to-UE) communications. In some implementations, UE 105 can include a machine-type communication (MTC) UE, such as an evolved or enhanced MTC (eMTC) UE. In some implementations, UE 105 can include an Internet of things (IoT) UE, such as a narrowband IoT (NB-IoT) UE, among other examples.

RAN 115 includes one or more devices capable of communicating with UE 105 using a cellular radio access technology (RAT). For example, RAN 115 can include a base station 110, a base transceiver station, a radio base station, a node B, an evolved node B (eNB), a gNB, a base station subsystem, a cellular site, a cellular tower (e.g., a cell phone tower, a mobile phone tower, and/or the like), an access point, a transmit receive point (TRP), a radio access node, a macrocell base station, a microcell base station, a picocell base station, a femtocell base station, or a similar type of device. In some implementations, base station 110 has the same characteristics and functionality of RAN 115, and vice versa. RAN 115 can transfer traffic between UE 105 (e.g., using a cellular RAT), one or more other RANs 115 (e.g., using a wireless interface or a backhaul interface, such as a wired backhaul interface), and/or core network 120. RAN 115 can provide one or more cells that cover geographic areas. Some RANs 115 can be mobile base stations. Some RANs 115 can be capable of communicating using multiple RATs.

In some implementations, RAN 115 can perform scheduling and/or resource management for UEs 105 covered by RAN 115 (e.g., UEs 105 covered by a cell provided by RAN 115). In some implementations, RAN 115 can be controlled or coordinated by a network controller, which can perform load balancing, network-level configuration, and/or the like. The network controller can communicate with RAN 115 via a wireless or wireline backhaul. In some implementations, RAN 115 can include a network controller, a self-organizing network (SON) module or component, or a similar module or component. In other words, RAN 115 can perform network control, scheduling, and/or network management functions (e.g., for other RAN 115 and/or for uplink, downlink, and/or sidelink communications of UEs 105 covered by RAN 115). In some implementations, RAN 115 can apply network slice policies to perform the network control, scheduling, and/or network management functions. In some implementations, RAN 115 can include a central unit and multiple distributed units. The central unit can coordinate access control and communication with regard to the multiple distributed units. The multiple distributed units can provide UEs 105 and/or other RANs 115 with access to data network 125 via core network 120.

Core network 120 includes various types of core network architectures, such as a 5G Next Generation (NG) Core, an LTE Evolved Packet Core (EPC), among other examples. In some implementations, core network 120 can be implemented on physical devices, such as a gateway, a mobility management entity, among other examples. In some implementations, the hardware and/or software implementing core network 120 can be virtualized (e.g., through the use of network function virtualization and/or software-defined networking), thereby allowing for the use of composable infrastructure when implementing core network 120. In this way, networking, storage, and compute resources can be allocated to implement the functions of core network 120 in a flexible manner as opposed to relying on dedicated hardware and software to implement these functions.

Data network 125 includes one or more wired and/or wireless data networks. For example, data network 125 can include an Internet Protocol (IP) Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, or an operator services network, among other examples, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
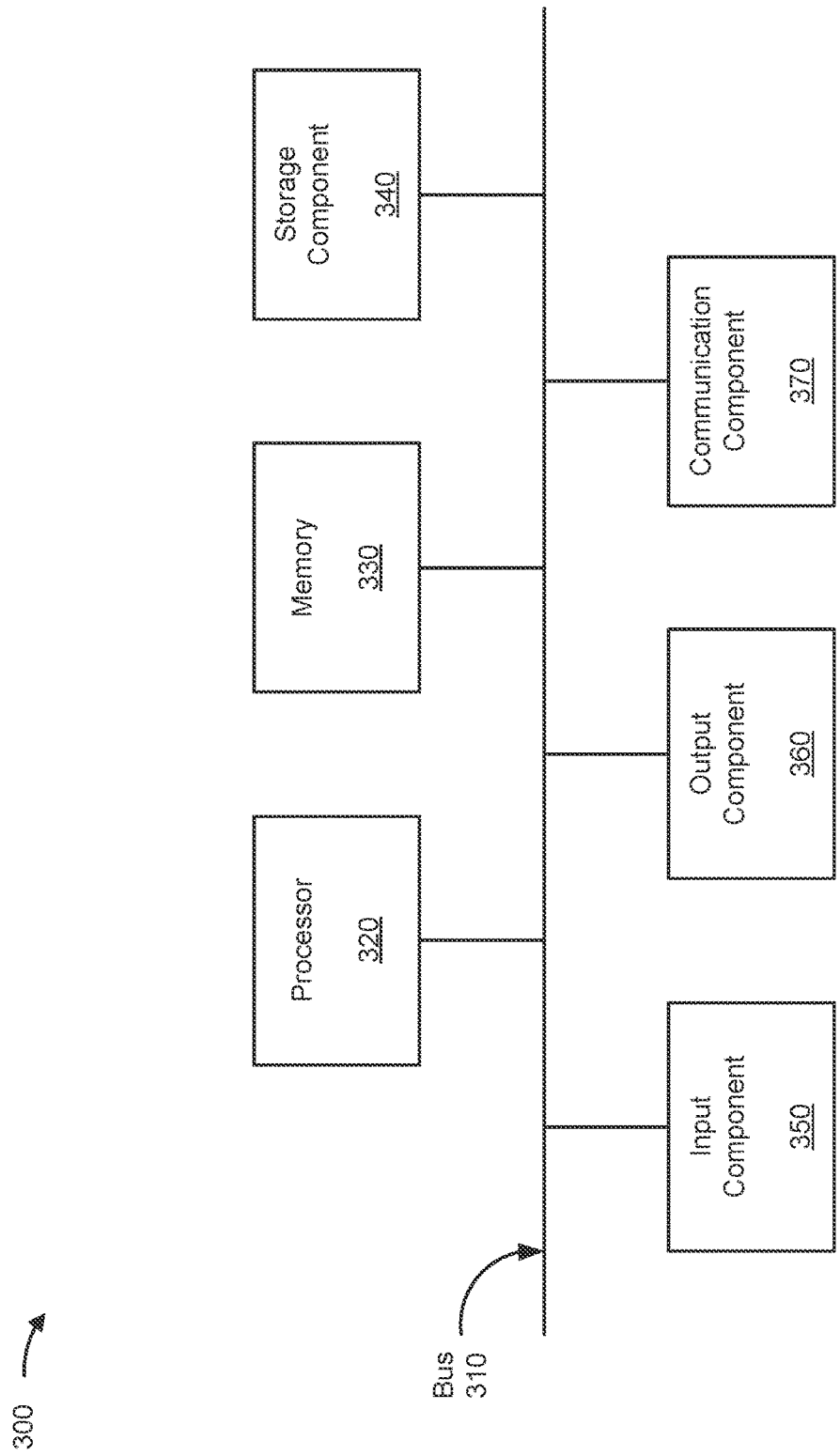
FIG. 3 is a diagram of example components of one or more devices of FIG. 2.

FIG. 3 is a diagram of example components of a device 300, which may correspond to base station 110 and/or UE 105. In some implementations, base station 110 and/or UE 105 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
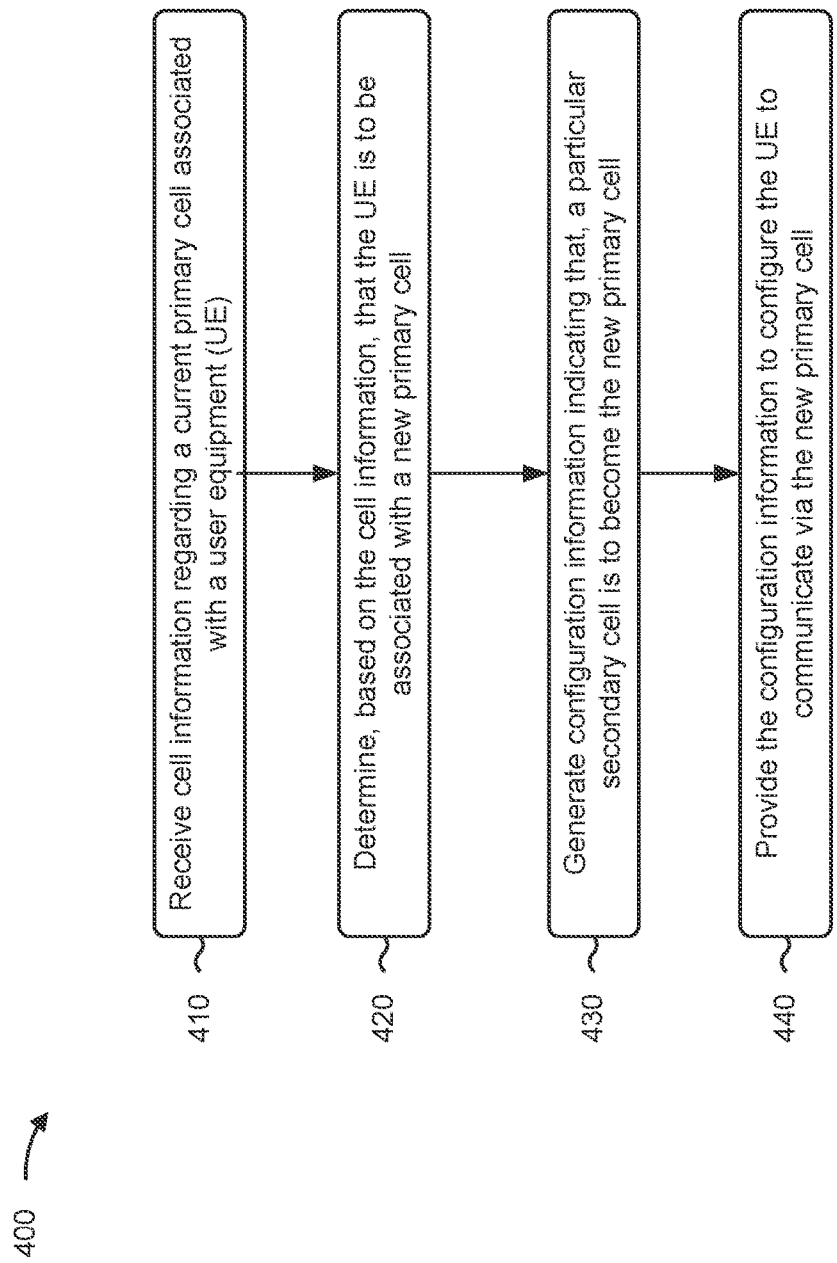
FIG. 4 is a flowchart of an example process associated with efficiently causing a secondary cell to become a primary cell.

FIG. 4 is a flowchart of an example process 400 associated with efficiently causing a secondary cell to become a primary cell. In some implementations, one or more process blocks of FIG. 4 may be performed by a device (e.g., base station 110). In some implementations, one or more process blocks of FIG. 4 may be performed by another device or a group of devices separate from or including the device, such as a UE (e.g., UE 105). Additionally, or alternatively, one or more process blocks of FIG. 4 may be performed by one or more components of device 300, such as processor 320, memory 330, storage component 340, input component 350, output component 360, and/or communication interface 370.

As shown in FIG. 4, process 400 may include receiving cell information regarding a current primary cell associated with a UE (block 410). For example, the device may receive cell information regarding a current primary cell associated with a UE, wherein the UE is further associated with a plurality of secondary cells, as described above. In some implementations, the UE is further associated with a plurality of secondary cells.

In some implementations, the cell information includes information identifying a measure of congestion associated with each of the particular secondary cell and the one or more other secondary cells, and wherein the method further comprises identifying the particular secondary cell and the one or more other secondary cells based on the congestion information.

In some implementations, the configuration information includes information indicating a first amount of time allocated for the UE to prepare to become configured to communicate via the new primary cell, and information indicating a second amount of time, after providing the configuration information, for the UE to be configured to communicate via the new primary cell.

As further shown in FIG. 4, process 400 may include determining, based on the cell information, that the UE is to be associated with a new primary cell (block 420). For example, the device may determine, based on the cell information, that the UE is to be associated with a new primary cell, wherein the new primary cell is selected from the plurality of secondary cells, as described above. In some implementations, the new primary cell is selected from the plurality of secondary cells.

As further shown in FIG. 4, process 400 may include generating configuration information indicating that: (block 430). For example, the device may generate configuration information indicating that: a particular secondary cell, of the plurality of secondary cells, is to become the new primary cell, and one or more other secondary cells, of the plurality of secondary cells, are to remain secondary cells, as described above.

In some implementations, the cell information includes signaling quality information identifying a measure of signal quality associated with the current primary cell, and wherein determining that the UE is to be associated with the new primary cell comprises determining that the measure of signal quality does not satisfy a signal quality threshold, and determining that the UE is to be associated with the new primary cell based on determining that the measure of signal quality does not satisfy the signal quality threshold.

In some implementations, the configuration information includes information indicating an adjustment associated with timing advance. In some implementations, the configuration information includes information indicating an update to security keys associated with data transmission via the new primary cell.

As further shown in FIG. 4, process 400 may include providing, to the UE, the configuration information to configure the UE to communicate via the new primary cell (block 440). For example, the device may provide, to the UE, the configuration information to configure the UE to communicate via the new primary cell, as described above.

In some implementations, providing the configuration information comprises providing an RRC message that includes the configuration information, wherein the configuration information is an information element of the RRC message. In some implementations, providing the configuration information comprises providing the configuration information to cause the UE to adjust a timing associated with the UE transmitting data via the new primary cell.

In some implementations, providing the configuration information comprises providing the configuration information to cause the UE to update security keys associated with the UE transmitting data via the new primary cell.

In some implementations, providing the configuration information comprises providing the configuration information to cause the UE to prepare to become configured to communicate via the new primary cell within the first amount of time, and be configured to communicate via the new primary cell within the second amount of time after providing the configuration information.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method performed by a device, the method comprising:
   receiving cell information regarding a current primary cell associated with a user equipment (UE),
      wherein the UE is further associated with a plurality of secondary cells;
   determining, based on the cell information, that the UE is to be associated with a new primary cell,
      wherein the new primary cell is selected from the plurality of secondary cells;
   generating configuration information indicating that:
      a particular secondary cell, of the plurality of secondary cells, is to become the new primary cell, and
      one or more other secondary cells, of the plurality of secondary cells, are to remain secondary cells,
         wherein the particular secondary cell is identified based on a measure of signal quality associated with the particular secondary cell, a measure of congestion associated with the particular secondary cell, or a measure of load associated with the particular secondary cell; and
   providing, to the UE, a message that includes the configuration information to configure the UE to communicate via the new primary cell,
      wherein the configuration information is an information element of the message.

2. The method of claim 1, wherein the cell information includes:
   signal quality information identifying a measure of signal quality associated with the current primary cell, and
   wherein determining that the UE is to be associated with the new primary cell comprises:
   determining that the measure of signal quality, associated with the current primary cell, does not satisfy a signal quality threshold; and
   determining that the UE is to be associated with the new primary cell based on determining that the measure of signal quality, associated with the current primary cell, does not satisfy the signal quality threshold.

3. The method of claim 1, wherein the cell information includes:
   congestion information identifying a measure of congestion associated with each of the particular secondary cell and the one or more other secondary cells, and
   wherein the method further comprises:
   identifying the particular secondary cell and the one or more other secondary cells based on the congestion information.

4. The method of claim 1, wherein providing the message comprises:
   providing a radio resource control (RRC) message that includes the configuration information,
      wherein the configuration information is an information element of the RRC message.

5. The method of claim 1, wherein the configuration information includes information indicating an adjustment associated with timing advance, and
   wherein providing the message comprises:
   providing the message to cause the UE to adjust a timing associated with the UE transmitting data via the new primary cell.

6. The method of claim 1, wherein the configuration information includes information indicating an update to security keys associated with data transmission via the new primary cell, and
   wherein providing the message comprises:
   providing the message to cause the UE to update security keys associated with the UE transmitting data via the new primary cell.

7. The method of claim 1, wherein the configuration information includes:
   information indicating a first amount of time allocated for the UE to prepare to become configured to communicate via the new primary cell, and
   information indicating a second amount of time, after providing the configuration information, for the UE to be configured to communicate via the new primary cell, and wherein providing the message comprises:
   providing the configuration information to cause the UE to:
      prepare to become configured to communicate via the new primary cell within the first amount of time, and
      be configured to communicate via the new primary cell within the second amount of time after providing the configuration information.

8. A device, comprising:
   one or more processors configured to:
      receive, from a user equipment (UE), cell information regarding a current primary cell associated with the UE,
         wherein the cell information includes information regarding the current primary cell, and
         wherein the UE is further associated with a plurality of secondary cells;
      determine, based on the cell information, that the UE is to be associated with a new primary cell;
      generate configuration information indicating that:
         a particular secondary cell, of the plurality of secondary cells, is to become the new primary cell, and
         one or more other secondary cells, of the plurality of secondary cells, are to remain secondary cells,
            wherein the particular secondary cell is identified based on a measure of signal quality associated with the particular secondary cell or a measure of congestion associated with the particular secondary cell; and
      provide, to the UE, a message that includes the configuration information,
         wherein the message is provided to configure the UE to communicate via the new primary cell.

9. The device of claim 8, wherein the configuration information includes:
information regarding a plurality of candidate cells for data transmission by the UE, and
information indicating that a candidate cell, of the candidate cells, is to become a next primary cell based on the UE receiving a first medium access control (MAC) control element (CE) identifying the candidate cell, and
information indicating that the UE is to start transmitting and receiving data using the candidate cell based on the UE receiving a second MAC CE identifying the candidate cell.

10. The device of claim 9, wherein the one or more processors are further configured to:
provide, to the UE, the first MAC CE to cause the UE to prepare to transmit and receive data using the candidate cell, and
provide, to the UE, the second MAC CE to cause the UE to start transmitting and receiving data using the candidate cell.

11. The device of claim 8, wherein the current primary cell is associated with a first band of Fifth Generation/New Radio (5G/NR),
wherein the particular secondary cell is associated with a second band of 5G/NR, and
wherein the configuration information includes:
information identifying the particular secondary cell, and
information identifying the one or more other secondary cells.

12. The device of claim 8, wherein the cell information includes at least one of:
signal quality information identifying a measure of signal quality associated with the current primary cell, or
congestion information identifying a measure of congestion associated with the current primary cell, and
wherein the one or more processors, to determine that the UE is to be associated with the new primary cell, are configured to:
determine that the UE is to be associated with the new primary cell based on the at least one of the signal quality information or the congestion information.

13. The device of claim 8, wherein the one or more processors are further configured to:
receive, from the UE, confirmation information indicating that the UE has been configured to communicate via the new primary cell.

14. The device of claim 8, wherein the configuration information includes information indicating that the UE is to adjust a timing associated with the UE transmitting data, and
wherein the one or more processors, to provide the configuration information, are configured to:
provide the configuration information to cause the UE to adjust the timing associated with the UE transmitting data via the new primary cell.

15. A non-transitory computer-readable medium storing a set of instructions, the set of instructions comprising:
one or more instructions that, when executed by one or more processors of a device, cause the device to:
receive, from a user equipment (UE), cell information regarding a current primary cell associated with the UE,
wherein the UE is further associated with a plurality of secondary cells;
determine, based on the cell information, that the UE is to be associated with a new primary cell;
generate configuration information indicating that:
a particular secondary cell, of the plurality of secondary cells, is to become the new primary cell, and
one or more other secondary cells, of the plurality of secondary cells, are to remain secondary cells,
wherein the particular secondary cell is identified based on a measure of signal quality associated with the particular secondary cell or a measure of congestion associated with the particular secondary cell; and
provide, to the UE, a message that includes the configuration information,
wherein the message is provided to configure the UE to communicate via the new primary cell.

16. The non-transitory computer-readable medium of claim 15, wherein the one or more instructions, when executed by the one or more processors, further cause the device to determine:
a first amount of time allocated for the UE to prepare to become configured to communicate via the new primary cell, and
a second amount of time, after providing the configuration information, for the UE to become configured to communicate via the new primary cell,
wherein at least one of the first amount of time or the second amount of time is determined based on a capability of the UE, and
wherein the configuration information includes information identifying the first amount of time and the second amount of time.

17. The non-transitory computer-readable medium of claim 15, wherein the current primary cell is associated with a first band of Fifth Generation/New Radio (5G/NR), and
wherein the particular secondary cell is associated with a second band of 5G/NR different than the first band of 5G/NR.

18. The non-transitory computer-readable medium of claim 15, wherein the one or more instructions, that cause the device to provide the message, cause the device to:
provide a radio resource control (RRC) message that includes the configuration information.

19. The non-transitory computer-readable medium of claim 15, wherein the configuration information includes information indicating an update to security keys associated with data transmission, and
wherein the one or more instructions, that cause the device to provide the message, cause the device to:
provide the configuration information to cause the UE to update security keys associated with the UE transmitting data via the new primary cell.

20. The non-transitory computer-readable medium of claim 15, wherein the cell information includes congestion information identifying the measure of congestion associated with the particular secondary cell, and
wherein the one or more instructions, when executed by the one or more processors, further cause the device to:
identify the particular secondary cell based on the congestion information.

* * * * *